United States Patent Office 3,767,601
Patented Oct. 23, 1973

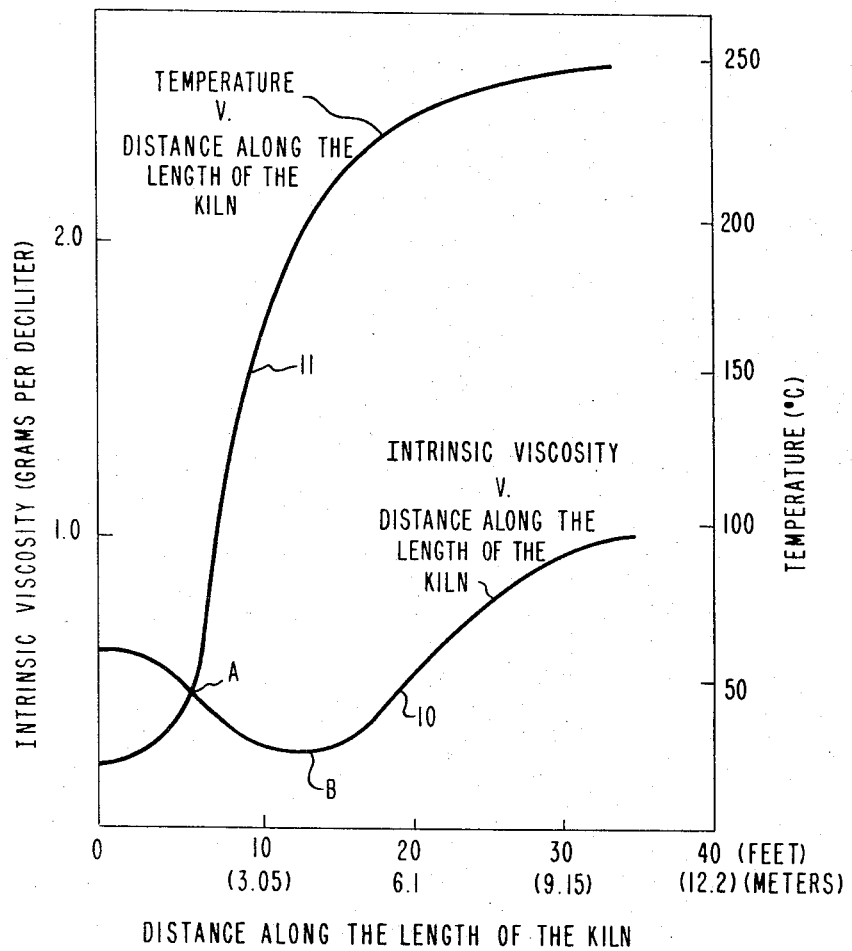

3,767,601
SOLID PHASE POLYMERIZATION OF WASTE POLYETHYLENE TEREPHTHALATE
Kenneth Leith Knox, Circleville, Ohio, assignor to E. I. du Pont de Nemours and Company, Wilmington, Del.
Continuation-in-part of abandoned application Ser. No. 82,169, Oct. 19, 1970. This application Sept. 1, 1971, Ser. No. 176,990
Int. Cl. C08g 53/22
U.S. Cl. 260—2.3
5 Claims

ABSTRACT OF THE DISCLOSURE

A solid phase process of polymerizing waste polyethylene terephthalate (PET) by charging comminuted waste PET to a rotary kiln and heating the charge in an atmosphere of hot, dry, scavenging gas thereby increasing the intrinsic viscosity. PET polymers having increased viscosities provide a polymer useful in manufacturing durable goods.

RELATED APPLICATION

This application is a continuation-in-part of U.S. Ser. No. 82,169, filed Oct. 19, 1970, now abandoned.

BACKGROUND OF THE INVENTION

This invention relates to solid phase polymerization of polyethylene terephthalate (PET) waste material.

In manufacturing PET films, particularly oriented PET films, starting with a polymer having an intrinsic viscosity of about 0.50 to 0.55, nearly 30 to 50% of each production run is waste. This waste must be reused in some manner in order to make the manufacturing process economical. One method of reusing waste PET is to glycolize the waste PET to monomer and recycle.

It has been found, however, that there is an increasing need for more durable films, such as those prepared from high viscosity PET polymer. Therefore, it is desirable to add versatility to the manner of reusing waste PET film prepared from a polymer having an intrinsic viscosity of about 0.50 to 0.55 by finding a way of processing this waste PET film to increase its viscosity so that it can be used to produce more durable films thereby increasing the commercial usefulness of waste PET.

SUMMARY OF THE INVENTION

Accordingly, the present invention provides a process of converting waste PET to a relatively high viscosity polymer useful in manufacturing various durable products, such as biaxially oriented films for motor insulators, cast crystallized film for printed circuits, slit film fibers and molding powder. The process consists essentially of the solid phase polymerization of waste PET film, prepared from a polymer having an intrinsic viscosity of about 0.50 to 0.55 by:

(a) comminuting the waste PET,
(b) charging the comminuted waste PET to an inclined rotary-flighted kiln,
(c) heating the charge in the rotary kiln to a temperature of about 220 to 250° C. for about 2 to 4 hours to polymerize the PET waste increasing the intrinsic viscosity, and
(d) passing a hot, dry, inert, scavenging gas through the charge to remove volatile reaction products.

Preferably the intrinsic viscosity of the PET is increased to a value of at least about 0.8.

BRIEF DESCRIPTION OF THE DRAWING

The figure illustrates a relationship of the flake polymerization-depolymerization equilibrium in the present invention.

DETAILS OF THE INVENTION

The present invention is carried out by the following sequential steps: Polyethylene terephthalate (PET) waste is gathered from all sources available from a commercial production run of manufacturing PET film. The waste material includes bead trim, slitter selvage, rejection film, and waste film from start-up operations. The waste PET is comminuted to a size suitable for the particular materials handling system to be used. An average comminution size would pass about one-eighth inch screen. The comminuted PET is charged to an inclined rotary kiln. The kiln is provided with internal flights to ensure good mixing and continuous turnover of the waste PET during operation.

A hot, dry, scavenging gas inert to the chemical reaction taking place in the kiln is passed through the PET charge in the kiln. The scavenging gas must be inert, particularly oxygen-free because oxygen will degrade and discolor the polymer. Nitrogen is the preferred scavenging gas because it is economical and readily available.

This process can be operated in batch or in continuous process and if the process is run in a continuous fashion, the scavenging gas is fed to the kiln in countercurrent fashion to the direction of charge in the kiln. The scavenging gas removes volatile polymerization reaction products including glycol along with other impurities, such as water, that can cause undesirable secondary reactions. For maximum efficiency, glycol is removed from the scavenging gas by a cool glycol spray and the scavenging gas is recycled through the kiln.

The following relationships can be used to assist in obtaining the desired end results. Intrinsic viscosity increases with (a) increased amounts of scavenging gas, (b) increased temperature in the kiln, (c) increased width of lifters in a rotary kiln, (d) increased kiln diameter, and (e) increased kiln length. It has also been found that preheating the comminuted flakes to reaction temperature reduces the size of the reactor necessary to effect polymerization. Preheating is conveniently carried out while the comminuted flakes are being transported to the kiln.

The speed of rotation, the angle of incline, and the flight geometry of the kiln is selected to ensure that the PET charge and scavenging gas are well mixed and that the charge moves through the kiln in a uniform manner without experiencing severe agglomeration or spurious holdups. The term "kiln" is used in its general sense and includes conventionally known rotary driers or direct-fired calciners, provided that they are equipped to offer a mechanical means of showering the comminuted PET through the scavenging gas atmosphere.

The temperature of the kiln and the residence time of the charge in the kiln along with the flow rate and the composition of the scavenging gas are controlled to promote the solid phase polymerization of the PET and inhibit polymer degradation such as thermal chain scission, hydrolysis, glycolysis, dimer, trimer and tetramer formation and also the elimination of color-forming reactions. After the comminuted PET has passed through the kiln, it is removed and either quenched in a dry atmosphere or fed hot to an extruder. Thereafter, the quenched product is conveyed either to storage or to the feed hopper of an extruder from which an end product is produced. The feeding of hot material to an extruder conserves sensible heat in the polymer and reduces power requirements per pound of polymer in extrusion.

The use of a rotary-flighted kiln provides good mixing between the charge and the scavenging atmosphere, prevents undesirable agglomeration and bridging of the charge in the heated zone and is very inexpensive to operate compared to other known reactors such as dielectrically heated reactors plus the continuous aspect provides uniformity of treatment and economy.

To assure uniform and good exposure of flake in a kiln to the scavenging gas, the following equipment requirements should be observed: (1) Efficient internal flake lifters, i.e., a number of wide width lifters, should be provided; (2) the diameter of the kiln should be large, preferably at least 10% of the length of the kiln; and (3) rotation should be smooth and continuous. This assures a continuing showering of all particles through the gas stream.

The proper contact of the flake and the scavenger gas stream is an important aspect of the present invention. Attempts at solid phase polymerization of flake without the use of a kiln but instead using a fluidized bed arrangement were not successful because the flake bridged, resulting in channeling of the heating and scavenging gas. This resulted in nonuniform heating and scavenging of polymerization by-products (glycol and water) and caused nonuniformity in the molecular weight increase.

This process is insensitive to a wide variety of charge materials. For example, the PET charge can be oriented or unoriented crystalline polymer of various molecular weights and molecular weight distribution and in the form of a flake, pellet, powder, film, bead trim, or fiber. The degree of uniformity of the product resulting from this process is surprising in view of the grossness of the variously charged materials.

In this process, preheating the comminuted PET flake is optional crystallization of the waste materials can be done; however, it is not required. The waste PET can be continuously air conveyed directly to comminuters or chippers and from there directly to the hopper of the rotary kiln. On exiting the kiln, the hot material can be quenched in dry conveying air and airveyed either to storage or on to further processing. The resulting end product surprisingly does not adversely discolor during the long heating cycles required to effect solid phase polymerization.

One of the most surprising aspects of this invention is the fact that solid phase polymerization of oriented waste PET proceeds very readily and without any problems such as agglomeration of polymer, polymer sticking to processing equipment or degradation of polymer.

A particular element of surprise is a shift in the polymerization-depolymerization equilibrium in the present process, ilustrated in the figure. The extent to which the equilibrium polymerization-depolymerization reaction results in increased molecular weight depends upon the relative rates of the reactions of polymerization, $(k_1)$ and of depolymerization $(k_2)$, $k_1$ must be greater than $k_2$.

The figure illustrates the operating pattern for the resulting intrinsic viscosity of polymerized, chopped polyethylene terephthalate scrap film waste, introduced at an intrinic viscosity of 0.55, at 20° C. into a flighted, rotary kiln, externally heated to 250° C. and scavenged with dry nitrogen gas flowing at 195 cubic feet per minute (STP). The kiln is 40 feet long with an inside diameter of 8 feet and rotates at 4 revolutions per minute (r.p.m.). PET flakes are fed into the kiln at a rate of 1,000 pounds per hour. The intrinsic viscosity of the polymer is measured in grams per deciliter in a 40/60 parts by weight solution of tetrachloroethane/phenol at 25° C.

Referring to the figure, two graphs appear, one relating to the intrinisic viscosity versus the distance along the length of the kiln identified as 10, and the second relating to the temperature in the kiln versus the distance along the length of the kiln.

It can be seen that initially the net effect is one of depolymerization, i.e., along curve 10 from A to B, $k_2$ is greater than $k_1$. At point B, the equilibrium is shifted, the two rates become equal, then $k_1$ becomes greater than $k_2$. These rates are dependent on the partial pressure of glycol in the nitrogen gas as well as the equilibrium partial pressure of glycol above the polymer and the temperature. The glycolysis reaction tends to occur in the feed section of the kiln, where the waste polymer is being heated. This effect can be substantially avoided, either by locating the nitrogen exhaust at a point in the kiln where the flake has reached a temperature of about 200° C. (and below 250° C., the temperature at which agglomeration is troublesome for polyethylene terephthalate) or, instead of introducing the flake into the kiln at room temperature, the flake can be preheated in an inert atmosphere before introduction into the kiln.

This invention will be illustrated by the following examples. All parts, percentages and proportions are by weight unless otherwise indicated.

Examples 1 and 2

A kiln three inches in diameter and six inches long is equipped with two one-half-inch-wide flights or lifters located internally approximately 180 degrees apart. A charge of 20 grams of waste PET flake comminuted to pass a one-eight-inch-diameter screen is fed to the kiln. Nitrogen at about 600 standard cubic centimeters per minute is fed to the kiln as a scavenging gas. The kiln is operated at a rotational speed of about 5.5 r.p.m. The charge is made to the kiln at room temperature and the kiln is brought to operating temperature while it is rotating and with a continuous flow of nitrogen through the kiln. Two flake samples are run through the kiln, using varying retention times at temperatures of 220° C. and 250° C. The testing results are shown in Table I, following. The results show an increase in intrinsic viscosity with time and temperature. In addition, the color of the film is not aversely affected and the film is acceptable for commercial use.

TABLE I.—SOLID PHASE POLYMERIZATION OF PET FLAKE

| Ex. No. | Waste sample | Temp., ° C. | Time at temp., hours | Intrinsic viscosity | Tendency to agglomerate | Bulk density, grams/cc. |
|---|---|---|---|---|---|---|
| 1 | Waste PET processed. | | | .52 | | .175 |
| | | 220 | 0.7 | .63 | None | |
| | | 220 | 2.7 | .76 | do | |
| | | 220 | 5.0 | .87 | do | |
| | | 250 | 1.0 | .78 | do | |
| | | 250 | 3.0 | 1.13 | do | |
| | | 250 | 5.0 | 1.40 | Slight (½" dia.) | |
| 2 | Waste PET processed. | | | .58 | | .503 |
| | | 220 | 0.7 | .68 | None | |
| | | 220 | 3.0 | .91 | do | |
| | | 220 | 5.0 | .93 | do | |
| | | 250 | 1.0 | 1.05 | Slight (⅛" dia.) | |
| | | 250 | 3.0 | 1.35 | Slight (¼" dia.) | |
| | | 250 | 5.0 | 1.49 | do | |

I claim:
1. A process for the solid phase polymerization of waste polyethylene terephthalate prepared from a polymer having an intrinsic viscosity of about 0.50–0.55 consisting essentially of:
   (a) comminuting the waste polyethylene terephthalate into flakes,
   (b) charging the flakes to an inclined rotary-flighted kiln,
   (c) rotating the kiln to continuously mix, turn over and shower the flakes in the kiln while simultaneously heating the flakes to a temperature of about 220 to 250° C. for about 2 to 4 hours to polymerize the flakes increasing their intrinsic viscosity, and
   (d) continuously passing a hot, dry, inert, scavenging gas through the flakes in the kiln to remove volatile reaction products.
2. The process of claim 1 in which the scavenging gas is nitrogen.
3. The process of claim 1 in which the intrinsic viscosity is increased to a value of at least about 0.8 as measured in grams per deciliter in a 40/60 parts by weight solution of tetrachloroethane/phenol at 25° C.
4. The process of claim 1 in which the comminuted polyethylene terephthalate is continuously charged to the kiln and the scavenging gas is fed to the kiln countercurrent to the polyethylene terephthalate charge.
5. The process of claim 4 including the following steps:
   (e) continuously removing the polymerized polyethylene terephthalate from the discharge end of the kiln, and
   (f) quenching the discharged polyethylene terephthalate.

References Cited
UNITED STATES PATENTS

| | | | |
|---|---|---|---|
| 3,405,098 | 10/1968 | Heighton et al. | 260—75 |
| 3,330,809 | 7/1967 | Perlowski et al. | 260—75 |
| 3,480,596 | 11/1969 | Simons | 260—75 |
| 3,344,091 | 9/1967 | Russin et al. | 260—2.3 |

OTHER REFERENCES
Ward, Defensive Publication T 870,010, published Jan. 13, 1970, filed Mar. 4, 1968.

MURRY TILLMAN, Primary Examiner

C. J. SECCURO, Assistant Examiner

U.S. Cl. X.R.

260—75 M